(12) United States Patent
Lee et al.

(10) Patent No.: US 11,899,400 B2
(45) Date of Patent: Feb. 13, 2024

(54) DISPLAY DEVICE

(71) Applicant: Samsung Display Co., LTD., Yongin-si (KR)

(72) Inventors: Ji Won Lee, Suwon-si (KR); Jae Joong Kwon, Suwon-si (KR); Young Chan Kim, Incheon (KR); Jae Ho You, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 101 days.

(21) Appl. No.: 17/308,713

(22) Filed: May 5, 2021

(65) Prior Publication Data

US 2022/0083005 A1   Mar. 17, 2022

(30) Foreign Application Priority Data

Sep. 14, 2020   (KR) .......................... 10-2020-0117487

(51) Int. Cl.
| | | |
|---|---|---|
| *G03H 1/22* | (2006.01) | |
| *G03H 1/26* | (2006.01) | |
| *F21V 8/00* | (2006.01) | |
| *G02B 27/00* | (2006.01) | |

(52) U.S. Cl.
CPC .............. *G03H 1/268* (2013.01); *G02B 6/003* (2013.01); *G02B 6/0036* (2013.01); *G02B 27/0093* (2013.01); *G03H 2222/34* (2013.01); *G03H 2223/16* (2013.01); *G03H 2226/05* (2013.01)

(58) Field of Classification Search
CPC ............... G03H 1/268; G03H 2222/34; G03H 2223/16; G03H 2226/05; G03H 2227/03; G02B 5/32; G02B 6/003; G02B 6/0036; G02B 27/0093; G02B 2027/0154; G02B 30/33
USPC .................. 359/15, 2, 463, 464, 30; 348/51
See application file for complete search history.

(56) References Cited

U.S. PATENT DOCUMENTS

| | | | | |
|---|---|---|---|---|
| 5,570,207 | A * | 10/1996 | Chang ...................... | G03H 1/22 359/2 |
| 6,014,164 | A * | 1/2000 | Woodgate .......... | G02B 27/0093 348/E13.058 |
| 7,957,061 | B1 * | 6/2011 | Connor ................ | H04N 13/302 359/464 |

(Continued)

FOREIGN PATENT DOCUMENTS

| | | |
|---|---|---|
| KR | 10-2015-0073458 | 7/2015 |
| KR | 10-2015-0086799 | 7/2015 |

(Continued)

*Primary Examiner* — Audrey Y Chang
(74) *Attorney, Agent, or Firm* — KILE PARK REED & HOUTTEMAN PLLC

(57) ABSTRACT

A display device includes a light source part including a first light source and a second light source, a collimation lens that collimates light incident from the light source part, a wave guide that guides and diffracts the light incident from the collimation lens, a spatial light modulator that modulates the light passing through the wave guide so as to form a holographic pattern for reproducing a holographic image, a focusing optical system that focuses the holographic image on a space, and a light separating plate disposed between the light source part and the collimation lens, the light separating plate separating light of the first light source and light of the second light source from each other.

21 Claims, 12 Drawing Sheets

(56) References Cited

U.S. PATENT DOCUMENTS

| | | | | |
|---|---|---|---|---|
| 2012/0105929 A1* | 5/2012 | Sung | ........................ | G02B 5/32 |
| | | | | 359/9 |
| 2014/0016051 A1* | 1/2014 | Kroll | ........................ | G03H 1/02 |
| | | | | 359/15 |
| 2014/0285862 A1* | 9/2014 | Song | ........................ | G02B 5/32 |
| | | | | 359/30 |
| 2014/0376207 A1* | 12/2014 | Futterer | ............... | G02B 6/0035 |
| | | | | 359/3 |

FOREIGN PATENT DOCUMENTS

| | | |
|---|---|---|
| KR | 10-2020-0004579 | 1/2020 |
| KR | 10-2020-0052199 | 5/2020 |

\* cited by examiner

DISPLAY DEVICE

CROSS-REFERENCE TO RELATED APPLICATION(S)

This application claims priority to and benefits of Korean Patent Application No. 10-2020-0117487 under 35 U.S.C. § 119, filed on Sep. 14, 2020 in the Korean Intellectual Property Office, the entire contents of which are incorporated herein by reference.

BACKGROUND

1. Technical Field

The disclosure relates to a display device.

2. Description of the Related Art

As a method of realizing a three-dimensional (3D) image, a stereoscopic method and an auto-stereoscopic method may be used. The stereoscopic method includes a polarized stereoscopic method and a shutter stereoscopic method, and the auto-stereoscopic method includes a lenticular method and a parallax barrier method.

Such methods use binocular parallax between two eyes, and there may be a limitation in an increase in the number of viewpoints, and the sense of depth perceived by the brain and the focal point of the eyes may not match, which can make viewers feel tired.

As 3D image display method, in which the sense of depth perceived by the brain and the focal point of the eyes match and full parallax may be provided, holographic display methods are gradually being put to practical use.

The holographic display method uses a principle of reproducing an image of an original object by applying and diffracting reference light onto a hologram pattern in which an interference fringe obtained by interfering object light reflected from the original object and the reference light may be recorded.

In the holographic display method in practical use, instead of directly exposing an original object to obtain a holographic pattern, a computer generated hologram (CGH) may be provided to a spatial light modulator as an electrical signal. According to the input CGH signal, the spatial light modulator may form a holographic pattern to diffract reference light, thereby generating a 3D image.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a holographic display device that may have a small volume and a wide viewing angle.

The scope of the disclosure is not limited to the above, and other unmentioned aspects may be clearly understood by those skilled in the art from the following descriptions.

An embodiment of a display device may include a light source part including a first light source and a second light source, a collimation lens that collimates light incident from the light source part, a wave guide that guides and diffracts the light incident from the collimation lens, a spatial light modulator that modulates the light passing through the wave guide so as to form a holographic pattern for reproducing a holographic image, a focusing optical system that focuses the holographic image on a space, and a light separating plate disposed between the light source part and the collimation lens, the light separating plate separating light of the first light source and light of the second light source from each other.

A height of the collimation lens may be less than a height of the wave guide.

The wave guide may include a first surface facing the light source and a second surface opposite to the first surface. Light emitted from the collimation lens may be incident on a portion of the first surface of the wave guide.

Light incident through the portion of the first surface of the wave guide may be diffused in the wave guide and may be uniformly emitted to an entirety of the second surface of the wave guide.

The wave guide may include a first diffraction pattern region in which the light of the first light source may be diffracted, and a second diffraction pattern region in which the light of the second light source may be diffracted.

The spatial light modulator may include a first holographic pattern region in which a first holographic pattern may be provided, the first holographic pattern modulating light passing through the first diffraction pattern region, and a second holographic pattern region in which a second holographic pattern may be provided, the second holographic pattern modulating light passing through the second diffraction pattern region.

In the wave guide, an incidence angle of light incident on the wave guide may be the same as an emission angle of light emitted from the wave guide.

The light separating plate may extend from the collimation lens toward the light source part.

The light separating plate may extend from an optical axis of the collimation lens toward a space between the first light source and the second light source.

The display device may further comprise an eye tracker configured to track a gaze of an observer, a light source moving part that may move the light source part in response to movement of the gaze of the observer, and a light separating plate rotating part that may rotate the light separating plate in response to the movement of the gaze of the observer.

The light separating plate may include a first end facing the collimation lens and located on an optical axis of the collimation lens, and a second end facing the light source part, and the light separating plate rotating part may rotate the second end of the light separating plate relative to the first end of the light separating plate.

The light separating plate rotating part may rotate the second end of the light separating plate so that the second end of the light separating plate faces between a space between the first light source and the second light source in case that the light source part is moved.

The light separating plate rotating part may rotate the second end of the light separating plate in a direction opposite to a direction in which the gaze of the observer is moved.

In case that the light source moving part moves the light source part in a first side direction relative to an optical axis of the collimation lens, the holographic image may be moved in a second side direction opposite to the first side direction relative to the optical axis of the collimation lens.

The light source moving part may move the light source part linearly.

The light source moving part may move the light source part along a curved line.

A center of curvature of a moving trajectory of the light source part may be located on an optical axis of the collimation lens.

The light source moving part may include a moving stage and a driving motor.

The light separating plate may include at least one of a light absorbing material and a light blocking material.

An embodiment of a display device may include a light source part including a pair of light sources, a light source moving part that moves the light source part, a light separating plate that separates light emitted from the pair of light sources from each other, and a light separating plate rotating part that rotates the light separating plate.

BRIEF DESCRIPTION OF THE DRAWINGS

The above and other aspects and features of the disclosure will become more apparent by describing embodiments thereof in detail with reference to the attached drawings, in which.

DETAILED DESCRIPTION OF THE EMBODIMENTS

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
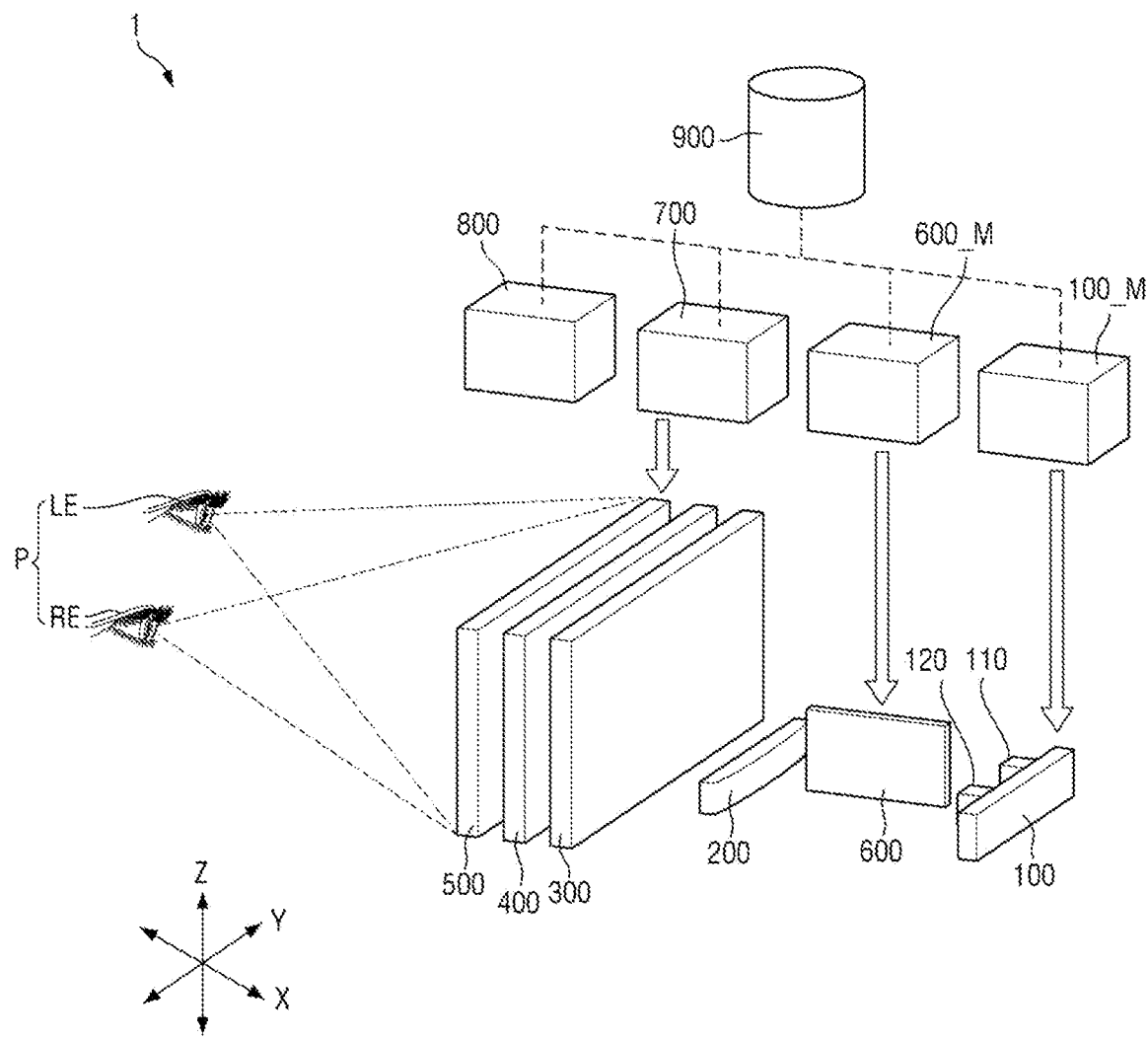
FIG. 1 is a schematic perspective view of a display device according to an embodiment.
Figure 2:
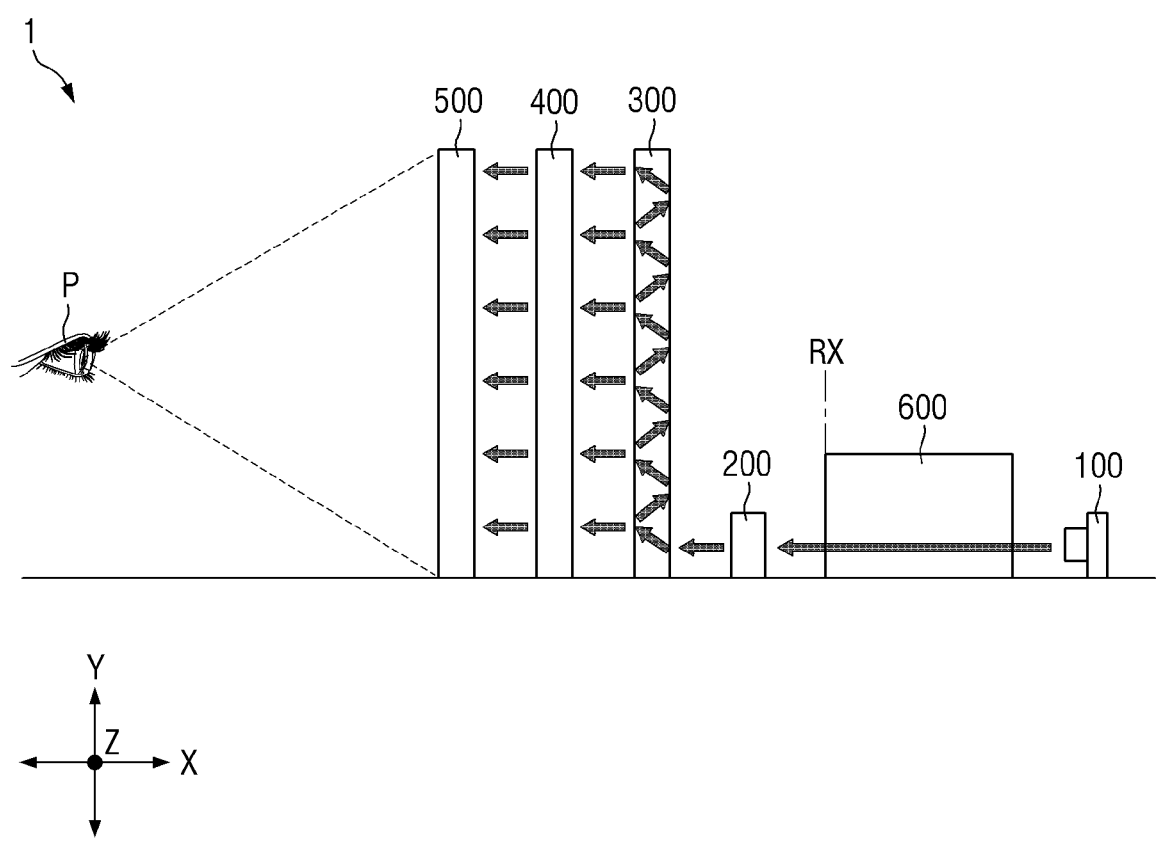
FIG. 2 is a schematic cross-sectional view of the display device of FIG. 1.
Figure 3:
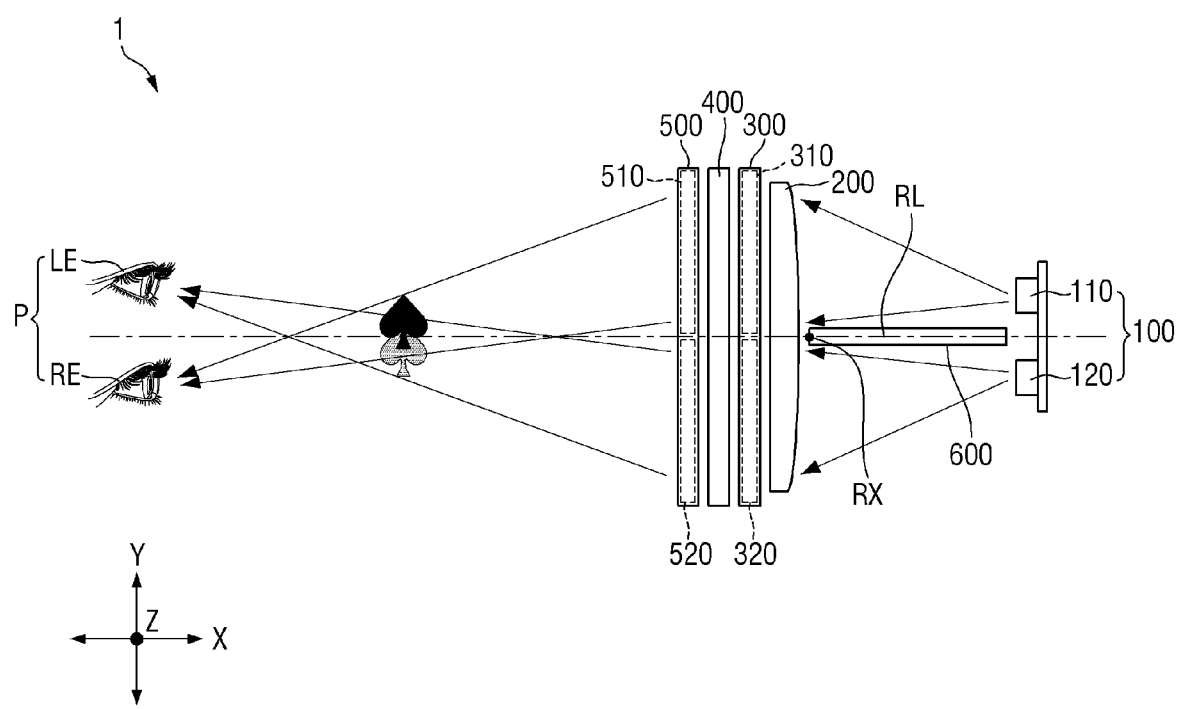
FIG. 3 is a schematic plan view of a display device in case that a light source part is located at a first position according to an embodiment.
Figure 4:
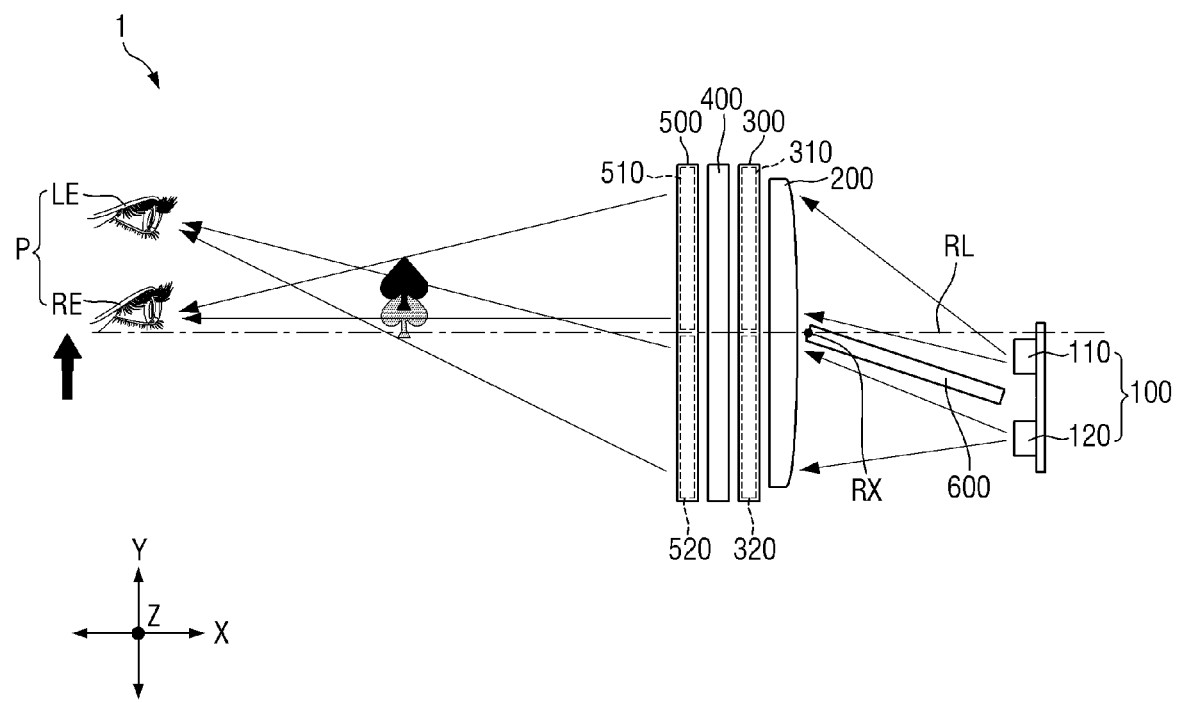
FIG. 4 is a schematic plan view of a display device in case that a light source part is located at a reference position according to an embodiment.
Figure 5:
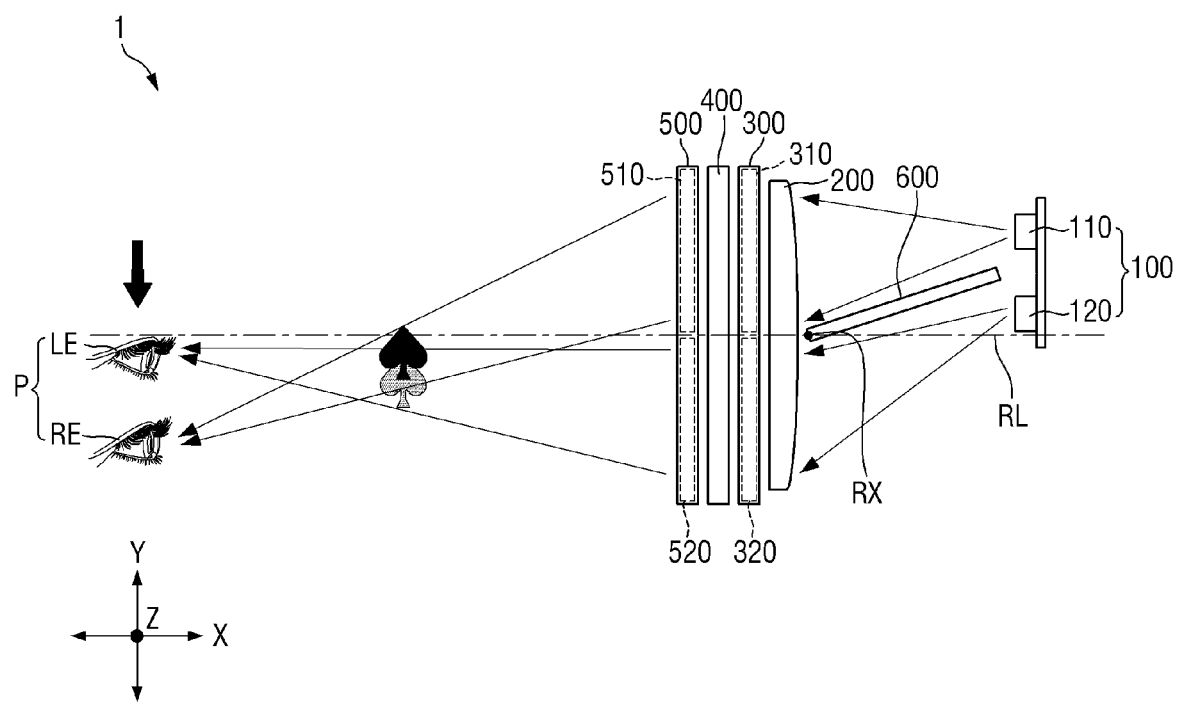
FIG. 5 is a schematic plan view of a display device in case that a light source part is located at a second position according to an embodiment.

FIG. 1 is a schematic perspective view of a display device according to an embodiment. FIG. 2 is a schematic cross-sectional view of the display device of FIG. 1. FIG. 3 is a schematic plan view of the display device in case that a light source part is located at a first position according to an embodiment. FIG. 4 is a schematic plan view of the display device in case that the light source part is located at a reference position according to an embodiment. FIG. 5 is a schematic plan view of the display device in case that the light source part is located at a second position according to an embodiment.

Hereinafter, a first direction X, a second direction Y, and a third direction Z may intersect each other in different directions. For example, the first direction X may refer to a length direction, the second direction Y may refer to a width direction, and the third direction Z may refer to a thickness direction. The first direction X, the second direction Y, and the third direction Z may include two or more directions. For example, the third direction Z may include an upward direction toward an upper side in the drawing, and a downward direction toward a lower side in the drawing. A surface of a member disposed to face in the upward direction may be referred to as an upper surface, and another surface of the member disposed to face in the downward direction may be referred to as a lower surface. However, the directions should be understood as referring to relative directions, and the disclosure is not limited to the above examples.

A display device 1 according to an embodiment of the disclosure may be a holographic display device. The holographic display device may use a principle of reproducing an image of an original object by applying and diffracting reference light onto a hologram pattern in which an interference fringe obtained by interfering object light reflected from the original object and the reference light may be recorded. The holographic display device may provide a computer generated hologram (CGH) as an electrical signal to a spatial light modulator 500 to be described below, and the spatial light modulator 500 may form a holographic pattern to diffract the reference light, thereby generating a three-dimensional (3D) image.

Referring to FIGS. 1 to 3, the display device 1 may include a light source part 100, a collimation lens 200, a wave guide 300, a focusing optical system 400, a spatial light modulator 500, a light separating plate 600, a light source moving part 100_M, a light separating plate rotating part 600_M, an image processor 700, an eye tracker 800, and a controller 900.

The light source part 100 may provide light. Light emitted from the light source part 100 may be incident on the collimation lens 200. The light may have spatial coherence and may be diffracted and modulated by the spatial light modulator 500 to be described below. In one embodiment, the light source part 100 may include a light-emitting diode. In some embodiments, the light source part 100 may include a laser diode.

The light source part 100 may include a first light source 110 for a holographic image to be formed in a right eye RE of an observer P and a second light source 120 for a holographic image to be formed in a left eye LE of the observer P.

The first light source 110 and the second light source 120 may be disposed in the second direction Y to be spaced apart from each other. Each of the first light source 110 and the second light source 120 may include a light-emitting diode.

Light of the first light source 110 and light of the second light source 120 may be separated from each other by the light separating plate 600 and may pass through the collimation lens 200, the wave guide 300, the focusing optical system 400, and the spatial light modulator 500 to be provided to each of the right eye RE and the left eye LE of the observer P.

The light of the first light source 110 may be incident on a portion of the collimation lens 200 in a plan view, for example, a portion located on an upper side relative to a reference line RL of FIG. 3, and the light of the second light source 120 may be incident on another portion of the collimation lens 200, for example, a portion located on a lower side relative to the reference line RL of FIG. 3. The reference line RL may extend in the first direction X in a plan view and pass through the center of the collimation lens 200, the wave guide 300, the focusing optical system 400, and/or the spatial light modulator 500. The reference line RL may be an optical axis of the collimation lens 200.

The light source moving part 100_M may move the light source part 100 in at least one direction. The light source moving part 100_M may move the light source part 100 along a straight line and/or a curved line. The light source moving part 100_M may move the light source part 100 in response to movement of a gaze of the observer P. Accordingly, the display device 1 may provide a wide viewing angle θ. In an embodiment, the first light source 110 and the second light source 120 may be moved together by the light source moving part 100_M. In some embodiments, the light source moving part 100_M may move the first light source 110 and the second light source 120 individually. Operations of the light source part 100 and the light separating plate 600 according to the movement of the gaze of the observer P will be described below with further reference to FIGS. 4 and 5.

The light separating plate 600 may be disposed between the light source part 100 and the collimation lens 200. The light separating plate 600 may include a plate-shaped member extending from the collimation lens 200 toward the light source part 100 in the first direction X. In detail, the light separating plate 600 may extend from a point on the optical axis of the collimation lens 200 toward a space between the first light source 110 and the second light source 120. The light separating plate 600 may include a first end which faces the collimation lens 200 and may be located on the optical axis of the collimation lens 200, and a second end which faces between the first light source 110 and the second light source 120.

The light separating plate 600 may separate the light of the first light source 110 and the light of the second light source 120 from each other to prevent interference between the light of the first light source 110 and the light of the second light source 120. For example, in case that the light source part 100 includes a light-emitting diode, the light separating plate 600 may prevent interference between the light of the first light source 110 and the light of the second light source 120, which may be emitted radially. In other words, the light separating plate 600 may separate a space through which the light of the first light source 110 passes and a space through which the light of the second light source 120 passes from each other.

The light separating plate 600 may include at least one of a light blocking material and a light absorbing material. For example, the light separating plate 600 may include a black-based material. As another example, the light separating plate 600 may include a metal thin film including chromium and/or chromium oxide, a resin containing a carbon pigment, graphite, or a combination thereof.

The light separating plate 600 may be rotated about a first rotation axis RX. In an embodiment, the first rotation axis RX may extend in the third direction Z and intersect the optical axis of the collimation lens 200 extending in the first direction X. The light separating plate 600 may be rotated by the light separating plate rotating part 600_M.

The light separating plate rotating part 600_M may rotate the light separating plate 600 in response to the movement of the gaze of the observer P. In an embodiment, the first rotation axis RX may be provided to the first end of the light separating plate 600, and the second end of the light separating plate 600 may be rotated relative to the first end. As illustrated in FIG. 3, the light separating plate 600 may be rotated by the light separating plate rotating part 600_M, and thus the light separating plate 600 may be disposed on the optical axis of the collimation lens 200 so as to be parallel to the optical axis or may be disposed to be inclined to the optical axis of the collimation lens 200.

The collimation lens 200 may be disposed between the light separating plate 600 and the wave guide 300. The collimation lens 200 may align direction of light radially emitted from the light source part 100 in parallel and emit the direction of light toward the wave guide 300. The light source part 100 may be disposed within a focal length of the collimation lens 200. In some embodiments, a focal point of the collimation lens 200 may be disposed on the light source part 100.

The collimation lens 200 may have a size smaller than that of the wave guide 300. Specifically, the collimation lens 200 may have a width in the second direction Y that may be the same as or similar to that of the wave guide 300 and may have a height smaller than a height of the wave guide 300 in the third direction Z. For example, the height of the collimation lens 200 may be about 1/10 or less of the height of the wave guide 300.

In some embodiments, the collimation lens 200 may be disposed on the light source part 100 and/or on a region of a first surface of the wave guide 300 facing the collimation lens 200. The light aligned in parallel by the collimation lens 200 may be incident on only the region of the first surface of the wave guide 300. In an embodiment, the region of the light incident surface may be a lower end of the first surface as shown in FIG. 2.

The wave guide 300 may guide and diffract the light incident through the collimation lens 200. In detail, as illustrated in FIG. 2, in the wave guide 300, the light incident from the lower end of the first surface may be diffused in the wave guide 300 so as to be uniformly emitted through an entirety of a second surface of the wave guide 300, which may be opposite to the first surface. The wave guide 300 may diffract the incident light so that an incidence angle of the incident light incident on the region of the first surface of the wave guide 300 may be identical to an emission angle of the emitted light emitted to the second surface of the wave guide 300. The second surface of the wave guide 300 may be a surface facing a field lens and/or the spatial light modulator 500. The wave guide 300 may include a diffractive optical element to which a diffraction pattern may be grated. In the display device 1 according to an embodiment, since the wave guide 300 may be applied, a general lens element for a holographic display may be omitted and thus a volume of the device may be reduced.

As illustrated in FIG. 3, the wave guide 300 may include a first diffraction pattern region 310, through which the light of the first light source 110 passes, and a second diffraction pattern region 320 through which the light of the second light source 120 passes. The first diffraction pattern region 310 and the second diffraction pattern region 320 may be disposed on an optical path of the first light source 110 and an optical path of the second light source 120, respectively. For example, in a plan view, the first diffraction pattern region 310 may be disposed on an upper side of FIG. 3 relative to the reference line RL, and the second diffraction pattern region 320 may be disposed on a lower side of FIG. 3 relative to the reference line RL. The first diffraction pattern region 310 and the second diffraction pattern region 320 may guide and diffract the light of the first light source 110 and the light of the second light source 120, respectively.

The focusing optical system 400 may focus the light passing through the wave guide 300 on a space. Reproduction light may be focused on the space by the focusing optical system 400 so that a holographic image may be formed in the space. The reproduction light may refer to light modulated by the spatial light modulator 500. In an embodiment, the focusing optical system 400 may focus the light emitted from the first light source 110 on the right eye RE of the observer P and focus the light emitted from the second light source 120 on the left eye LE of the observer P. In an embodiment, the focusing optical system 400 may be disposed between the spatial light modulator 500 and the wave guide 300, but the disclosure is not limited thereto. In some embodiments, positions of the focusing optical system 400 and the spatial light modulator 500 may be switched. In some embodiments, the focusing optical system 400 may include a fixed focus optical system having a fixed focal length and a variable focus optical system having a variable focal length changed by electrical control. The variable focus optical system may change a focal length in response to a change in distance between the observer P and the display device 1.

The spatial light modulator 500 may form a holographic pattern for diffracting and modulating the light passing through the wave guide 300 and/or the focusing optical system 400 according to a holographic signal provided from the image processor 700, for example, a CGH data signal. The spatial light modulator 500 may include a phase modulator capable of performing only phase modulation, an amplitude modulator capable of performing only amplitude modulation, and a complex modulator capable of performing both phase modulation and amplitude modulation. The spatial light modulator 500 may include a transmissive modulator, for example, a semiconductor modulator based on a compound semiconductor such as GaAs, a liquid crystal device (LCD) or a reflective modulator, for example, a digital micro-mirror device (DMD), a liquid crystal on silicon (LCoS), and a semiconductor modulator.

As illustrated in FIG. 3, the spatial light modulator 500 may include a first holographic pattern region 510 in which a first holographic pattern for modulating the light passing through the first diffraction pattern region 310 may be provided, and a second holographic pattern region 520 in which a second holographic pattern for modulating the light passing through the second diffraction pattern region 320 may be provided. The first holographic pattern region 510 and the second holographic pattern region 520 may be disposed on the optical path of the first light source 110 and the optical path of the second light source 120, respectively. For example, in a plan view, the first holographic pattern region 510 may be disposed on the upper side of FIG. 3 relative to the reference line RL, and the second holographic pattern region 520 may be disposed on the lower side of FIG. 3 relative to the reference line RL.

The image processor 700 may generate a holographic signal according to a holographic image to be provided to the observer P to provide the generated holographic signal to the spatial light modulator 500. The image processor 700 may control the operation of the light source. For example, the image processor 700 may control turning on or off of the first light source 110 and the second light source 120. The image processor 700 may include software or a semiconductor chip in which functions of the software may be embedded.

The eye tracker 800 may obtain an image of the observer P through a camera or the like and detect a pupil of the observer P in the image to analyze a position of the pupil. The eye tracker 800 may track a change in the position of the pupil of the observer P in real time and provide a tracking result to the image processor 700. The image processor 700 may generate a holographic signal in response to information about the position of the pupil of the observer P provided from the eye tracker 800. For example, the image processor 700 may generate a holographic signal according to a change in viewpoint according to the change in the position of the observer P and provide the generated holographic signal to the spatial light modulator 500. The image processor 700 may control the light source moving part 100_M so that the light proceeds toward the pupil of the observer P and change the positions of the first light source 110 and the second light source 120.

The controller 900 may control at least one of the light source moving part 100_M, the light separating plate rotating part 600_M, the image processor 700, and the eye tracker 800. Specific operations of the light source moving part 100_M, the light separating plate rotating part 600_M, the image processor 700, and the eye tracker 800 may be controlled by the controller 900. For example, the controller 900 may control the light source moving part 100_M so that the light source part 100 may be moved in response to the information about the position of the pupil of the observer P provided from the eye tracker 800. As another example, the controller 900 may control the light separating plate rotating part 600_M so that the light separating plate 600 may be rotated in response to the information about the position of the pupil of the observer P provided from the eye tracker 800.

Hereinafter, the operations of the light source part 100 and the light separating plate 600 according to the movement of the gaze of the observer P will be described in detail with reference to FIGS. 3 to 5. In FIGS. 3 to 5, left sides and right sides may be upper sides and lower sides relative to the reference line RL, respectively.

Referring to FIG. 3, in case that the observer P is located at a center of the display device 1, the light separating plate 600 and the light source part 100 may be located on the reference line RL. The case in which the observer P may be located at a center of the display device 1 may be a case in which the left eye LE and the right eye RE of the observer P are approximately located on the reference line RL and, in detail, may be a case in which the left eye LE and the right eye RE of the observer P may be located with the reference line RL interposed therebetween. The light separating plate 600 may be located on the reference line RL in the first direction X to be parallel to the reference line RL, and the first light source 110 and the second light source 120 may be symmetrically located with the reference line RL interposed therebetween.

Referring to FIGS. 4 and 5, in case that the observer P moves in a first side direction, the light source part 100 may be moved in a second side direction opposite to the first side direction, and the second end of the light separating plate 600 may be rotated in the second side direction relative to the first end of the light separating plate 600 disposed adjacent to the collimation lens 200. The position of the second end of the light separating plate 600 may be maintained to face the space between the first light source 110 and the second light source 120 of the light source part 100. Accordingly, despite the movement of the light source part 100, the light of the first light source 110 and the light of the second light source 120 may still be separated by the rotation of the light separating plate 600.

Referring to FIG. 4, in case that the observer P moves to the left, the light source part 100 may be moved to the right. Accordingly, the focal points of the light of the first light source 110 and the light of the second light source 120 and the holographic image visually recognized by the observer P may be moved to the left. The light separating plate 600 may be rotated to the right about the first rotation axis RX in the third direction Z. In detail, the second end of the light separating plate 600 disposed adjacent to the light source part 100 may be rotated in a clockwise direction relative to the first end of the light separating plate 600 provided with the first rotation axis RX.

Referring to FIG. 5, in case that the observer P moves to the right, the light source part 100 may be moved to the left. Accordingly, the focal points of the light of the first light source 110 and the light of the second light source 120 and the holographic image visually recognized by the observer P may be moved to the right. The light separating plate 600 may be rotated to the left about the first rotation axis RX. In detail, the second end of the light separating plate 600 may be rotated in a counterclockwise direction relative to the first end of the light separating plate 600 provided with the first rotation axis RX.

Figure 6:
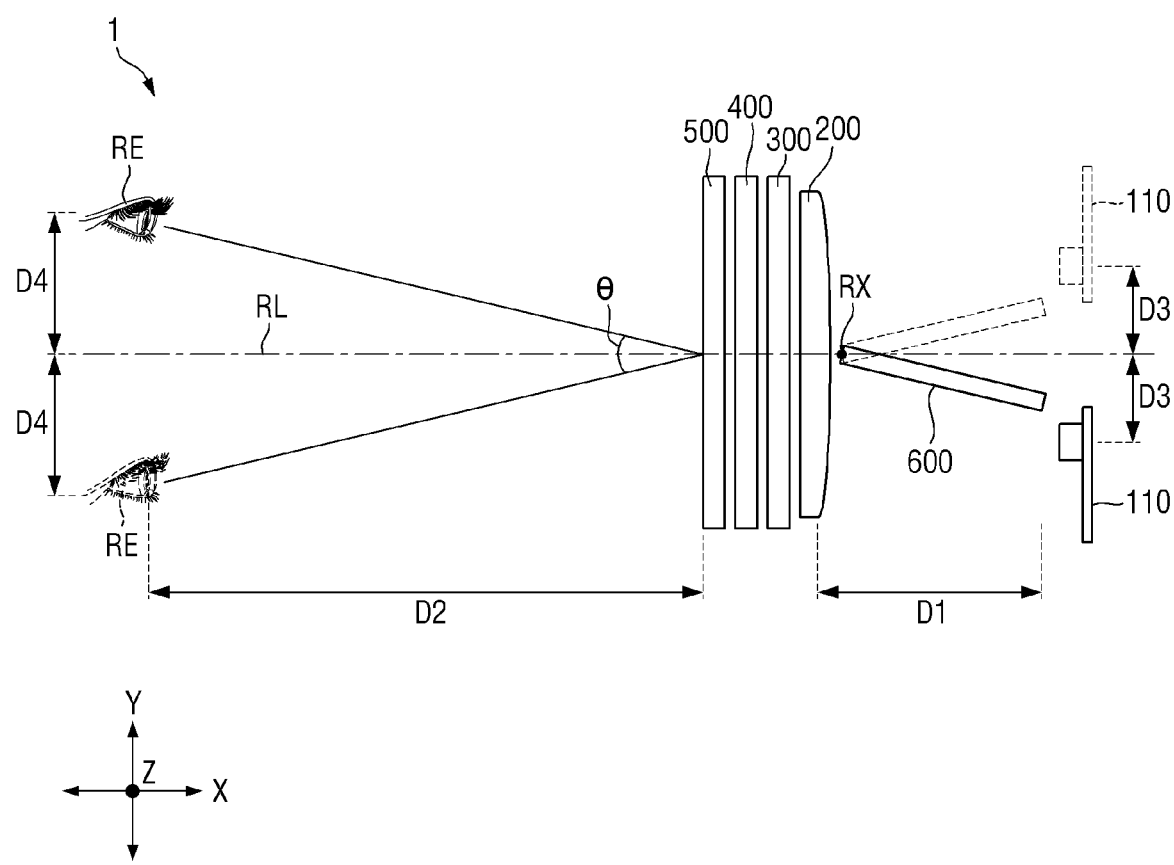
FIG. 6 is a schematic plan view illustrating a viewing angle of a display device according to an embodiment.

FIG. 6 is a schematic plan view illustrating a viewing angle of the display device according to an embodiment.

In FIG. 6, for convenience of description, only the right eye RE of an observer P is illustrated, but the following description may also be applied to the left eye LE of the observer P.

Referring to FIGS. 1 to 6, the light source part 100 may be moved in response to the change in the position of the observer P, specifically, the change in the position of the pupil of the observer P, and thus the viewing angle θ of the display device 1 may be increased.

As illustrated in FIG. 6, the viewing angle θ of the display device 1 may be determined by a first distance D1 in the first direction X between the light source part 100 and the collimation lens 200, a second distance D2 in the first direction X between the spatial light modulator 500 and the observer P, a third distance D3, which may be a movable distance of the light source part 100 in the second direction Y, and a fourth distance D4 which may be a movable distance of the observer P in the second direction Y. The third distance D3 and the fourth distance D4 may be distances measured relative to the reference line RL. The third distance D3 and the fourth distance D4 may be a distance in the left direction (the upper side of FIG. 6) and a distance in the right direction (the lower side of FIG. 6), respectively, relative to the reference line RL.

The viewing angle θ, the first distance D1, the second distance D2, the third distance D3, and the fourth distance D4 of the display device 1 may satisfy the following expressions.

$$\frac{D2}{D1} = \frac{D4}{D3} \quad \text{(Expression 1)}$$

$$\theta = 2\tan^{-1}\frac{D4}{D2} = 2\tan^{-1}\frac{D3}{D1} \quad \text{(Expression 2)}$$

For example, in case that the light source part 100 is moved by the third distance D3 relative to the reference line RL, a position of the focal point focusing on the pupil of the observer P may be moved by the fourth distance D4 so that a viewing angle θ may be secured.

The first distance D1, the second distance D2, the third distance D3, and the fourth distance D4 may be adjusted according to a desired viewing angle θ. For example, by adjusting the first distance D1 to be relatively smaller than the second distance D2, the viewing angle θ wider than the movable distance of the light source part 100 may be secured.

Figure 7:
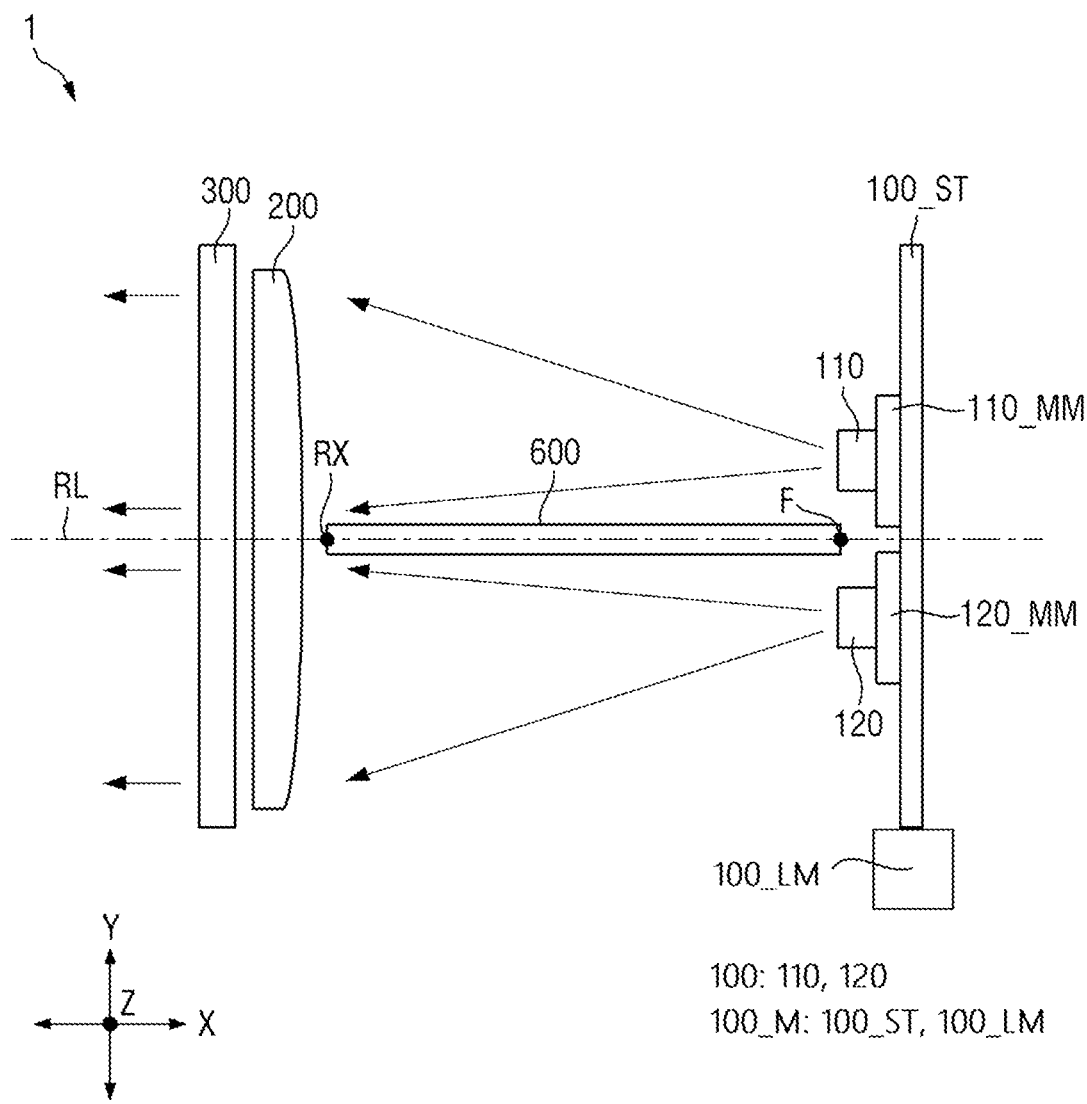
FIGS. 7 to 9 are schematic plan views illustrating a light source moving part of a display device according to an embodiment.
Figure 8:
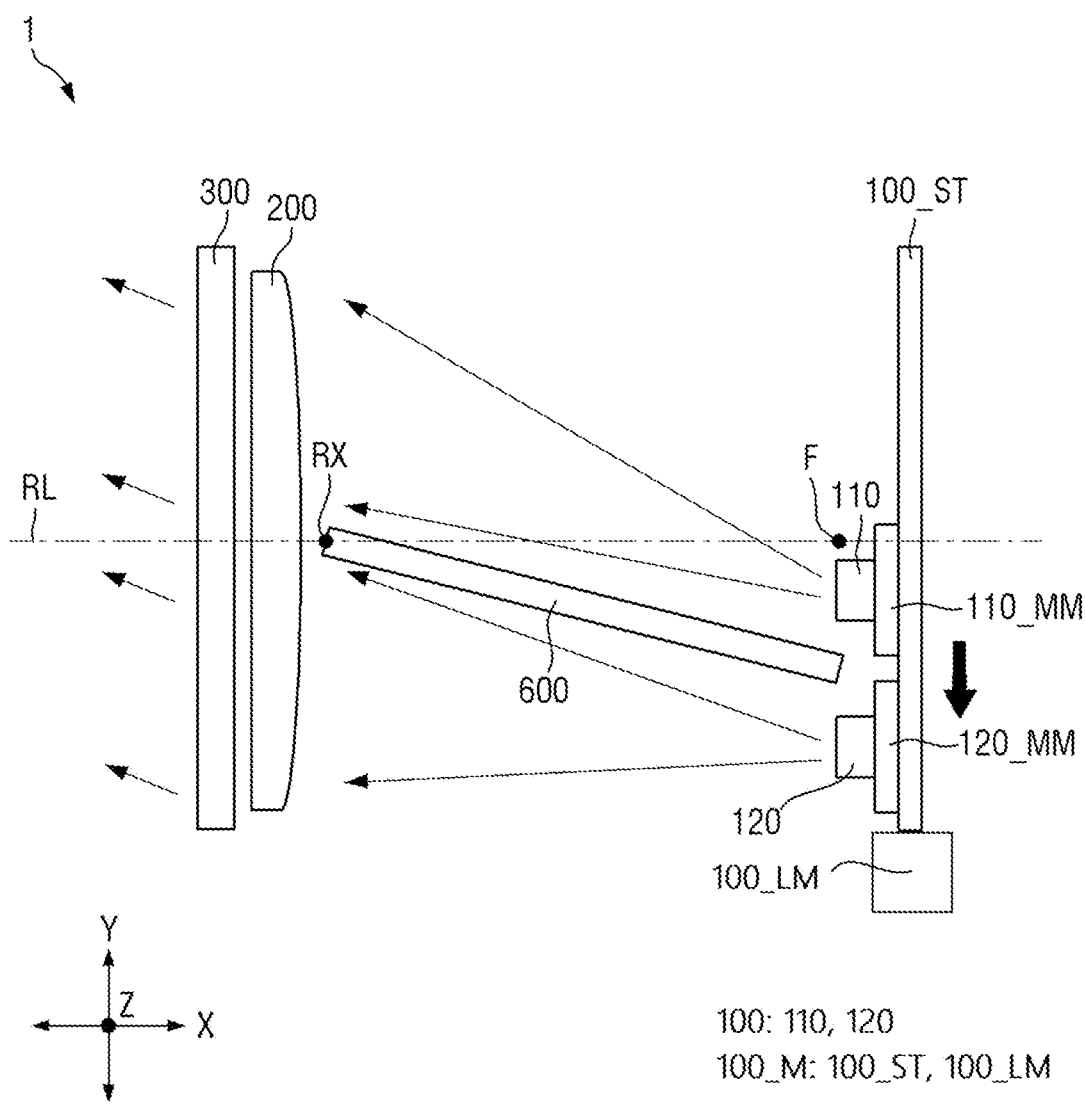
Figure 9:
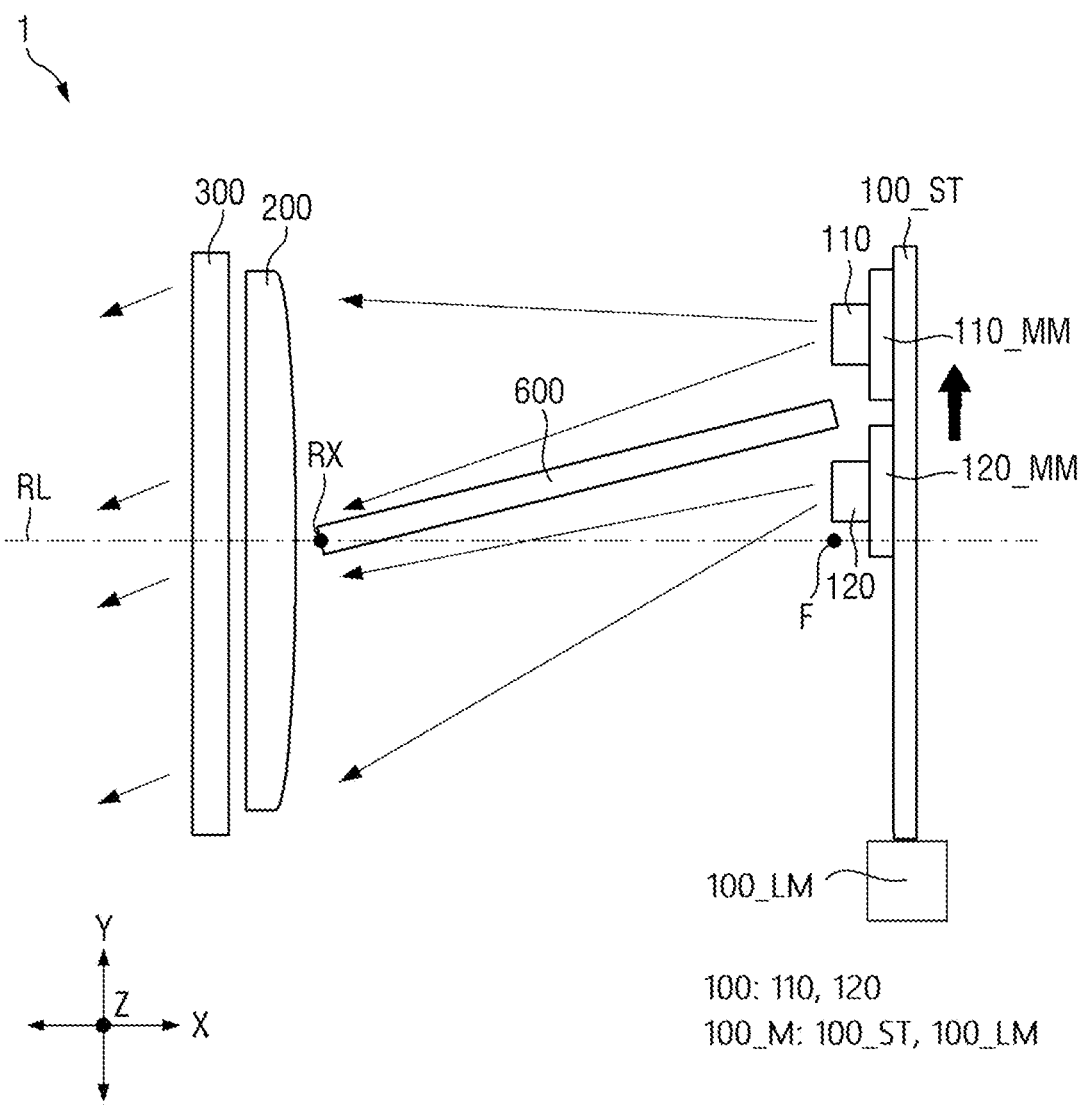

FIGS. 7 to 9 are schematic plan views illustrating the light source moving part of the display device according to an embodiment.

Referring to FIGS. 7 to 9, as described above, the light source moving part 100_M may move the light source part 100 in at least one direction. In an embodiment, the light source moving part 100_M may linearly move the light source part 100 in a second direction Y.

The light source moving part 100_M may include a moving stage 100_ST and a driving motor 100_LM.

The moving stage 100_ST may provide a moving path of the light source part 100. The moving stage 100_ST may extend straight in the second direction Y. The first light source 110 and the second light source 120 of the light source part 100 may be mounted on the moving stage 100_ST to be moveable in the second direction Y. On the moving stage 100_ST, a first moving member 110_MM and a second moving member 120_MM, which may couple the first light source 110 and the second light source 120 to the moving stage 100_ST so as to be slidable, respectively, may be provided. In some embodiments, the first light source 110 and the second light source 120 may be mounted on one of the first and second moving members 110 MM and 120 MM.

The driving motor 100_LM may move the first moving member 110_MM and the second moving member 120_MM in the second direction Y. An operation of the driving motor 100_LM may be controlled by the controller 900. The driving motor 100_LM may be a linear motor. In an embodiment, the driving motor 100_LM may be mounted on the moving stage 100_ST. In some embodiments, two linear motors may be mounted on one of the first moving member 110_MM and the second moving member 120_MM, respectively. In one embodiment, the first moving member 110_MM and the second moving member 120_MM may be moved at the same speed. In some embodiments, the first moving member 110_MM and the second moving member 120_MM may be moved at different speeds to correspond to, for example, the distance between the observer P and the display device 1.

Referring to FIGS. 3 and 7, in case that the observer P is located at a center of the display device 1, the first light source 110 and the second light source 120 may be located in the middle of the moving stage 100_ST. The first light source 110 and the second light source 120 may be symmetrically located with the reference line RL interposed therebetween.

In case that the observer P is located at the center of the display device 1, a distance between the light source part 100 and a focal point F of the collimation lens 200 may be the smallest. The focal point F of the collimation lens 200 may be located on the reference line RL passing through the center of the first light source 110 and the second light source 120. As described above, the reference line RL may be the optical axis of the collimation lens 200. The distance between the light source part 100 and the focal point F of the collimation lens 200 may be an average value of a distance between the first light source 110 and the focal point F and a distance between the second light source 120 and the focal point F. In some embodiments, the collimation lens 200 may include an optical system having focal points F, and the focal points F may each be located on one of the first light source 110 and the second light source 120.

In case that the observer P is located at a center of the display device 1, the light of the first light source 110 and the light of the second light source 120 may be aligned in parallel in the first direction X by the collimation lens 200 and incident on the wave guide 300, and the light incident on the wave guide 300 may be emitted to the focusing optical system 400 in parallel in the first direction X again.

Referring to FIGS. 4 and 8, in case that the observer P moves to the left side of the display device 1, the light source moving part 100_M may linearly move the first light source 110 and the second light source 120 to the right. The distance between the light source part 100 and the focal point F of the collimation lens 200 may be increased.

In case that the observer P is located on the left side of the display device 1, the light of the first light source 110 and the light of the second light source 120 may be obliquely incident on the collimation lens 200 as compared to the case in which the observer P may be located in front of the display device 1. Parallel light emitted from the collimation lens 200 may be emitted obliquely with respect to the reference line RL and incident on the wave guide 300.

As described above, the incidence angle of the incident light incident on the wave guide 300 from the collimation lens 200 and the emission angle of the light emitted from the wave guide 300 may be the same. Accordingly, the light emitted from the wave guide 300 may also be emitted obliquely with respect to the reference line RL. For example, the light emitted from the wave guide 300 may be emitted toward an upper left side of FIG. 7.

Referring to FIGS. 5 and 9, in case that the observer P moves to the right side of the display device 1, the light source moving part 100_M may linearly move the first light source 110 and the second light source 120 to the left. Similar to the case of FIGS. 4 and 8, the distance between the light source part 100 and the focal point F of the collimation lens 200 may be increased.

In case that the observer P is located on the right side of the display device 1, the light of the first light source 110 and the light of the second light source 120 may be obliquely incident on the collimation lens 200 as compared to the case in which the observer P may be located at a center of the display device 1, and the light emitted from the wave guide 300 may also be emitted obliquely with respect to the reference line RL. For example, the light emitted from the wave guide 300 may be emitted toward a lower left side of FIG. 7.

In some embodiments, in case that the light source part 100 is moved according to the movement of the observer P, the light source moving part 100_M may move the first light source 110 and the second light source 120 at different speeds so that an interval between the first light source 110 and the second light source 120 may be changed based on the distance between the observer P and the display device 1. For example, in case that the observer P moves to the left side of the display device 1 and the distance between the display device 1 and the observer P is reduced, the light source moving part 100_M may move the first light source 110 and/or the second light source 120 individually so that the interval between the first light source 110 and the second light source 120 may be increased. The first light source 110 and the second light source 120 may be moved to the right, but a moving speed of the second light source 120 may be lower than a moving speed of the first light source 110. As another example, in case that the observer P moves to the right side of the display device 1 and the distance between the display device 1 and the observer P is increased, the light source moving part 100_M may move the first light source 110 and/or the second light source 120 individually so that the interval between the first light source 110 and the second light source 120 may be reduced. The first light source 110 and the second light source 120 may be moved to the left, but the moving speed of the second light source 120 may be higher than the moving speed of the first light source 110. In some embodiments, the distance between the display device 1 and the observer P may be calculated based on a distance between the left eye LE and the right eye RE of the observer P measured by the eye tracker 800.

Figure 10:
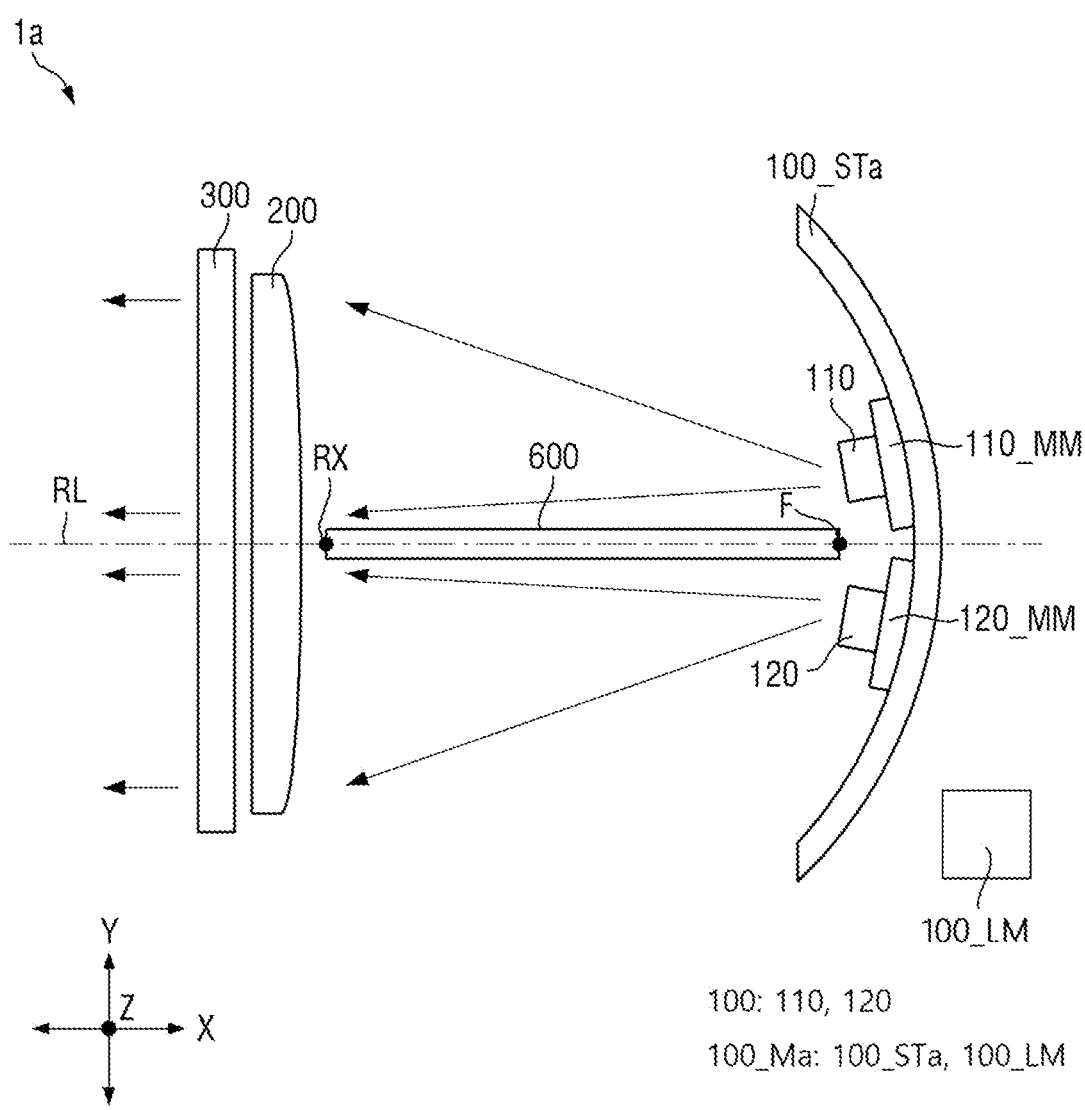
FIGS. 10 to 12 are schematic plan views illustrating a light source moving part of a display device according to another embodiment.
Figure 11:
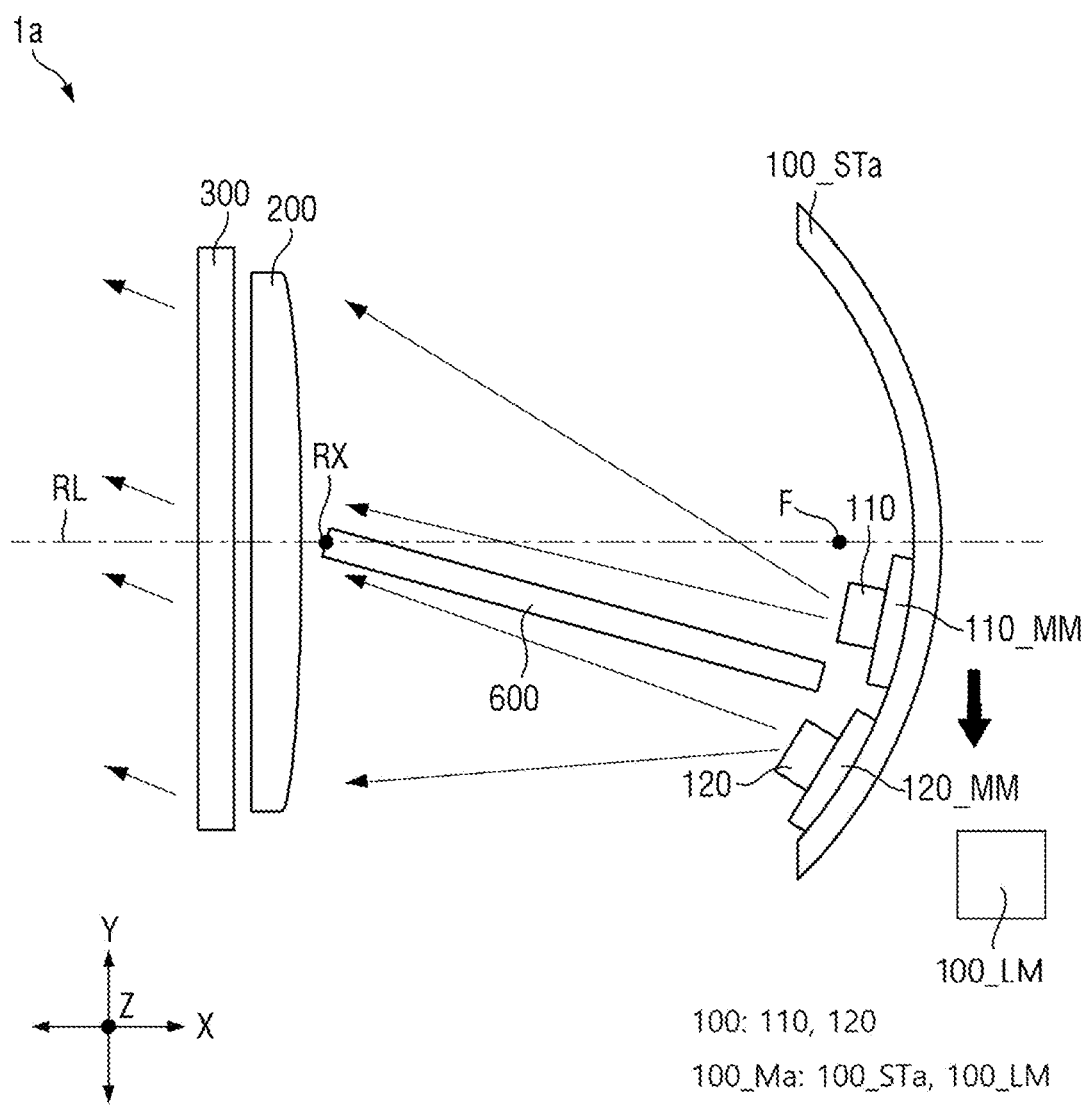
Figure 12:
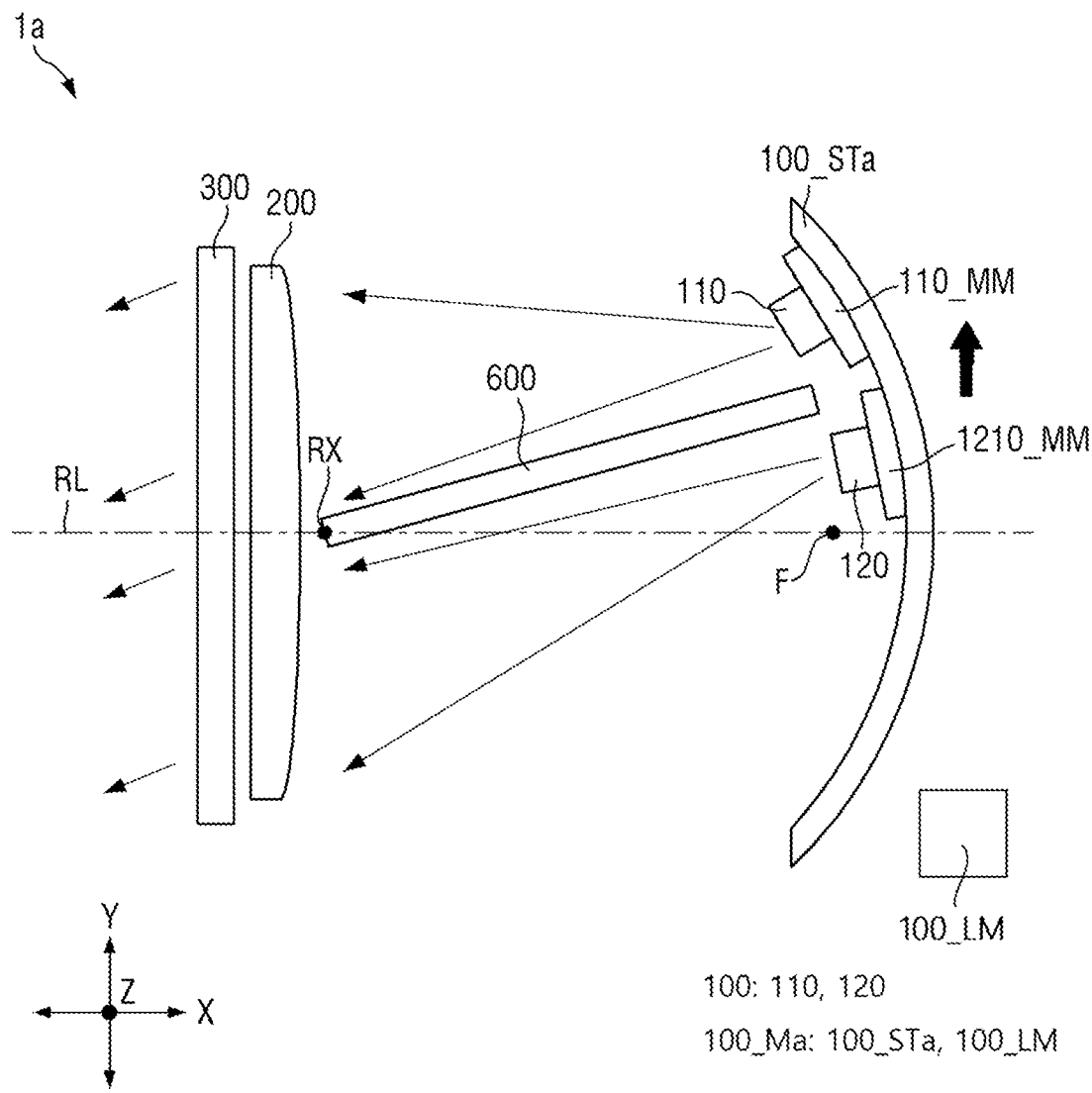

FIGS. 10 to 12 are schematic plan views illustrating a light source moving part of a display device according to another embodiment.

The embodiment of FIGS. 10 to 12 may be different from the embodiment of FIGS. 7 to 9 in that a light source part 100 may be moved along a curved line.

Referring to FIGS. 10 to 12, a light source moving part 100_Ma may include a moving stage 100_STa and a driving motor 100_LM.

The moving stage 100_STa may be disposed to have a specific curvature. As illustrated in FIGS. 10 to 12, the moving stage 100_STa may be disposed to have an arc shape of which a side facing a collimation lens 200 (or a light separating plate 600) may be concave and another side opposite to the one side may be convex in a plan view. A center of curvature of the specific curvature may be located on a reference line RL. In one embodiment, the center of curvature of the specific curvature may be a first rotation axis RX, but the disclosure is not limited thereto. A first light source 110 and a second light source 120 may be movably connected to the moving stage 100_STa by a first moving member 110_MM and a second moving member 120_WM, respectively.

The driving motor 100_LM may move the first moving member 110_MM and the second moving member 120_MM according to the curvature of the moving stage 100_STa. An operation of the driving motor 100_LM may be controlled by a controller 900. The driving motor 100_LM may move the first moving member 110_MM and the second moving member 120_MM at the same speed or at different speeds.

Referring to FIGS. 3 and 10, in case that the observer P is located at a center of the display device 1a, the first light source 110 and the second light source 120 may be symmetrically located on a central portion of the moving stage 100_STa with the reference line RL interposed therebetween. A distance between the light source part 100 and a focal point F of the collimation lens 200 may be the smallest.

Referring to FIGS. 4 and 11, in case that the observer P moves to the left side of the display device 1a, the light source moving part 100_Ma may move the first light source 110 and the second light source 120 to the right along a curved line. For example, the first light source 110 and the second light source 120 may be moved along a curved line, so that distances thereof from the first rotation axis RX may be constantly maintained. A distance in the second direction Y between the light source part 100 and the reference line RL may be increased, but a distance in the first direction X between the collimation lens 200 and the light source part 100 may be reduced. The distance between the light source part 100 and the reference line RL and the distance between the light source part 100 and the collimation lens 200 may be an average value of the distances measured based on the first light source 110 and the second light source 120, for example, a distance measured based on an intermediate point between the first light source 110 and the second light source 120.

Referring to FIGS. 5 and 12, in case that the observer P moves to the right side of the display device 1, the light source moving part 100_Ma may move the first light source 110 and the second light source 120 to the left along a curved line. Similar to the case of FIG. 11, the first light source 110 and the second light source 120 may be moved so that distances thereof from the first rotation axis RX may be constantly maintained, and thus the distance in the second direction Y between the light source part 100 and the reference line RL may be increased, but the distance in the first direction X between the collimation lens 200 and the light source part 100 may be reduced.

Referring to FIGS. 11 and 12, in case that the observer P moves to the left or right side of the display device 1a, an interval between the focal point F of the collimation lens 200 and the light source part 100 may be maintained to be relatively small compared to the case of FIGS. 9 and 10. Accordingly, lens aberration and/or chromatic aberration occurring as the light source part 100 moves away from the focal point F of the collimation lens 200 may be reduced.

Further, the light source part 100 may be moved so that the interval from the first rotation axis RX may be constantly maintained, and thus an interval between the second end of the light separating plate 600 and the light source part 100 and/or the moving stage 100_STa may be constantly maintained. Accordingly, despite the movement of the light source part 100, the light of the first light source 110 and the light of the second light source 120 radially emitted may be stably separated so as not to interfere with each other.

The display device according to an embodiment can have a small volume and a wide viewing angle.

Effects according to embodiments of the disclosure are not limited by the content disclosed above, and more various effects are included in the specification.

In concluding the detailed description, those skilled in the art will appreciate that many variations and modifications can be made to embodiments without substantially departing from the principles of the disclosure. Therefore, the disclosed embodiments are used in a generic and descriptive sense only and not for purposes of limitation.

What is claimed is:

1. A display device comprising:
   a light source part including a first light source and a second light source;
   a collimation lens that collimates light incident from the light source part;
   a wave guide that guides and diffracts the light incident from the collimation lens;
   a spatial light modulator that modulates the light passing through the wave guide so as to form a holographic pattern for reproducing a holographic image;
   a focusing optical system that focuses the holographic image on a space located at a finite distance from the focusing optical system; and
   a light separating plate disposed between the light source part and the collimation lens, the light separating plate separating light of the first light source and light of the second light source from each other, and
   wherein the wave guide includes:
   a first diffraction pattern region in which the light of the first light source is diffracted; and
   a second diffraction pattern region in which the light of the second light source is diffracted, and
   wherein the first diffraction pattern region and the second diffraction pattern region are separated from each other by a reference line which is an optical axis of the collimation lens.

2. The display device of claim 1, wherein a height of the collimation lens is less than a height of the wave guide.

3. The display device of claim 2, wherein
   the wave guide includes a first surface facing the light source and a second surface opposite to the first surface, and
   light emitted from the collimation lens is incident on a portion of the first surface of the wave guide.

4. The display device of claim 3, wherein light incident through the portion of the first surface of the wave guide is diffused in the wave guide and is uniformly emitted to an entirety of the second surface of the wave guide.

5. The display device of claim 1, wherein the spatial light modulator includes:
   a first holographic pattern region in which a first holographic pattern is provided, the first holographic pattern modulating light passing through the first diffraction pattern region; and
   a second holographic pattern region in which a second holographic pattern is provided, the second holographic pattern modulating light passing through the second diffraction pattern region.

6. The display device of claim 1, wherein, in the wave guide, an incidence angle of light incident on the wave guide is the same as an emission angle of light emitted from the wave guide.

7. The display device of claim 1, wherein the light separating plate extends from the collimation lens toward the light source part.

8. The display device of claim 7, wherein the light separating plate extends from an optical axis of the collimation lens toward a space between the first light source and the second light source.

9. The display device of claim 1, further comprising:
an eye tracker configured to track a gaze of an observer;
a light source moving part that moves the light source part in response to movement of the gaze of the observer; and
a light separating plate rotating part that rotates the light separating plate in response to the movement of the gaze of the observer.

10. The display device of claim 9, wherein
the light separating plate includes:
a first end facing the collimation lens and located on an optical axis of the collimation lens; and
a second end facing the light source part, and
the light separating plate rotating part rotates the second end of the light separating plate relative to the first end of the light separating plate.

11. The display device of claim 10, wherein the light separating plate rotating part rotates the second end of the light separating plate so that the second end of the light separating plate faces between a space between the first light source and the second light source in case that the light source part is moved.

12. The display device of claim 10, wherein the light separating plate rotating part rotates the second end of the light separating plate in a direction opposite to a direction in which the gaze of the observer is moved.

13. The display device of claim 9, wherein, in case that the light source moving part moves the light source part in a first side direction relative to an optical axis of the collimation lens, the holographic image is moved in a second side direction opposite to the first side direction relative to the optical axis of the collimation lens.

14. The display device of claim 9, wherein the light source moving part moves the light source part linearly.

15. The display device of claim 9, wherein the light source moving part moves the light source part along a curved line.

16. The display device of claim 15, wherein a center of curvature of a moving trajectory of the light source part is located on an optical axis of the collimation lens.

17. The display device of claim 9, wherein the light source moving part includes a moving stage and a driving motor.

18. The display device of claim 1, wherein the light separating plate includes at least one of a light absorbing material and a light blocking material.

19. A display device comprising:
a light source part including a pair of light sources;
optic devices including a spatial light modulator that modulates light received from the light source part so as to form a holographic pattern for reproducing a holographic image;
a light source moving part that moves the light source part relative to the optic devices;
a light separating plate that separates light emitted from the pair of light sources from each other; and
a light separating plate rotating part that rotates the light separating plate.

20. The display device of claim 19, wherein the light separating plate rotates about a center of rotation that is closer to the optic devices than the light source part.

21. The display device of claim 20, wherein the optic devices further include:
a collimation lens that collimates light incident from the light source part;
a wave guide that guides and diffracts the light incident from the collimation lens, and provides collimated light to the spatial light modulator; and
a focusing optical system that focuses the holographic image of the spatial light modulator on a space located at a finite distance from the focusing optical system.

* * * * *